(12) United States Patent  (10) Patent No.: US 8,732,590 B2
Barker et al.  (45) Date of Patent: May 20, 2014

(54) TECHNIQUES FOR PRESENTING CONTENT ITEMS TO MEMBERS OF A GROUP

(75) Inventors: Adam Barker, Toronto (CA); Ian McCarthy, Menlo Park, CA (US); Hans Brough, San Carlos, CA (US); James Richards, San Jose, CA (US); John Kristian, Los Altos, CA (US); Jason Powers, Santa Clara, CA (US); Julie Meridian, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/086,662

(22) Filed: Apr. 14, 2011

(65) Prior Publication Data

US 2012/0066618 A1   Mar. 15, 2012

Related U.S. Application Data

(60) Provisional application No. 61/323,927, filed on Apr. 14, 2010.

(51) Int. Cl.
*G06F 3/048* (2013.01)

(52) U.S. Cl.
USPC .......................................................... 715/753

(58) Field of Classification Search
CPC ........................................................ G06F 3/01
USPC .............................................. 715/753; 709/204
See application file for complete search history.

(56) References Cited

U.S. PATENT DOCUMENTS

| | | | |
|---|---|---|---|
| 2005/0060312 A1* | 3/2005 | Curtiss et al. | 707/7 |
| 2006/0048076 A1* | 3/2006 | Vronay et al. | 715/850 |
| 2006/0230061 A1* | 10/2006 | Sample et al. | 707/103 R |
| 2007/0234209 A1* | 10/2007 | Williams | 715/700 |
| 2008/0168045 A1* | 7/2008 | Suponau et al. | 707/5 |
| 2010/0030734 A1* | 2/2010 | Chunilal | 707/3 |
| 2011/0112912 A1* | 5/2011 | Wu | 705/14.73 |

* cited by examiner

*Primary Examiner* — William Bashore
*Assistant Examiner* — Jeanette J Parker
(74) *Attorney, Agent, or Firm* — Schwegman, Lundberg & Woessner, P.A.

(57) ABSTRACT

In a method of ranking or filtering new content items for presentation to members of a group of users of a social-networking service, content items that are candidates for presentation to the members are received. A user of the social-networking service is enabled to serve as a curator of the candidates, with the enabling including enabling the user to scroll through subsets of the candidates in a carousel user interface to indicate an opinion of the user with respect to an importance to the group of each of one or more candidates. One or more of the candidates are presented to the members of the group based on the opinion of the user with respect to the candidates.

14 Claims, 10 Drawing Sheets

FIG. 8A
spinner appears while message loads
*timing*
roll up 100ms
display the message 400ms
fade away 100ms
*message*
font-size:250%
(32.5pt, if assume a 13pt default)
Flag as Promotional   Follow Discussion
Flag as Job   Follow Alexis (the source of the post)
Flag as Inappropriate   Make Manager's Choice
  Delete
FIG. 8B
FIG. 9

1400

RSS update
one line article title
one line URL
mini article image, plus
three lines article intro text

RSS update
one line article title
one line URL
mini article image, plus
three lines article intro text

subject only
three line subject

subject + link
two line subject
one line article title
one line URL

subject + detail
two line subject
two lines detail message

subject + detail + link
one line subject
two lines detail message
one line article title

MOST ACTIVE DISCUSSIONS

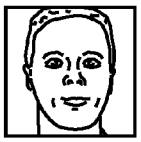

Follow Derek

μTorrent 2.0 has way more awesomeness than the previous version ('bout time!)
1 week ago

Suzy Soandso 15 min ago • This will have a huge impact on IP networks! Bit Torrent or any provider would be smart to check this out right away. Otherwise it's almost ...

24 more comments >

Alexiz
stop following

Online shoe shopping is unsatisfying
Remember last time when we are talking about this? Looks like these guys are back at it again, Joe. I know you're gonna love this.
4 days ago

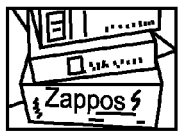

Amazon Closes Zappos Deal, Ends Up Paying $1.2 Billion  WWW.TECKCRUNCH.COM • March 3, 2010

Amazon earlier this morning announced the official closing of the acquisition of Zappos, a deal which we broke the news about back in July. Turns out the July earlier this morning announced the official...

Big McLargehuge 3 hrs ago • I, for one, welcome our shoe overlords. All the more reason to keep that Amazon Prime account. Booyah!

13 more comments >

 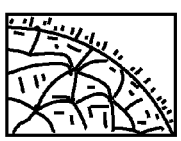

Could the Web Run Out of Addresses By 2010?
MASHABLE.COM • February 10, 2010
Alarmist claptrap about IP addresses. Probably some rambling about IPv6. Perhaps lamentation over the lack of available class A address space. Something else over the lack of available class...

Adam Barker 1 week ago • I love IP addresses and shoes!

9 more comments >

FIG. 15

TECHNIQUES FOR PRESENTING CONTENT ITEMS TO MEMBERS OF A GROUP

CROSS REFERENCE TO RELATED APPLICATIONS

This application claims the benefit of U.S. Provisional Application No. 61/323,927, filed Apr. 14, 2010, entitled "CAROUSEL OF THE NEW," which is incorporated herein by reference in its entirety.

TECHNICAL FIELD

This application relates generally to the technical field of data processing and content recommendation systems and, in one specific example, to enabling members of an online social group to act as curators of information that is exhibited via the online social group.

BACKGROUND

A social-networking site or service on the Internet (e.g., FACEBOOK®, TWITTER®, or LINKEDIN®) may have multiple users, each of whom maintains his own personal profile or home page. On his personal home page or within his profile, a user may specify information about himself. For example, the user may specify information about his relationships with other users of the social-networking site. That is, the user may maintain a list of other users to whom he is connected. In addition, the user may maintain a list of other users that he is following. The user's home page or personal profile information may indicate the other users with whom he is connected, the other users that he is following, and the other users who are following him.

In the context of a social-networking site, a designation of a first user as a "connection" of a second user may imply that the first user personally knows the second user. A designation of a first user as a "follower" of a third user may imply that the first user has specified an interest in being notified of the activities of the third user, regardless of whether the first user knows the third user personally. Via the user's home page or personal profile, the user may also specify information about his appearance (e.g., one or more photos of himself), his current status (e.g., what he is currently doing), his current company position or title, his work history or experience, his educational background (e.g., schools he has attended or degrees he has earned), his favorite websites, his contact information (e.g., phone numbers, email addresses, web sites, and so on), his personal interests, and so on. On his personal home page, the user may also share information, including an idea, a link (e.g., Uniform Resource Locator (URL)) to an Internet resource, an article, and so on with the general public or selected people.

BRIEF DESCRIPTION OF THE DRAWINGS

Some embodiments are illustrated by way of example and not limitation in the figures of the accompanying drawings in which:

FIG. 8 depicts an example carousel user interface in which a message has been overlaid briefly over a liked content item;

FIG. 9 depicts an example carousel user interface in which a message has been overlaid briefly over a passed content item;

FIG. 14 depicts various presentation formats in which content items may be presented to users;

FIG. 15 depicts an example of a "most popular" user interface element;

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application programming interface (API) or a user interface.

In a method of ranking or filtering new content items for presentation to members of a group of users of a social-networking service, content items that are candidates for presentation to the members are received. A user of the social-networking service is enabled to serve as a curator of the candidates, the enabling including enabling the user to scroll through subsets of the candidates in a carousel user interface to indicate an opinion of the user with respect to an importance to the group of each of one or more candidates. One or more of the candidate content items are presented to the members of the group based on the opinion of the user with respect to the candidate content items.

This method and the various embodiments disclosed herein may be implemented as a computer system having one or more modules or engines (e.g., hardware engines or software engines, implemented with a processor, or other application specific hardware). This method and the various embodiments disclosed herein may be embodied as instructions stored on a machine-readable medium that, when executed by a processor, cause the processor to perform the method.

Figure 1:
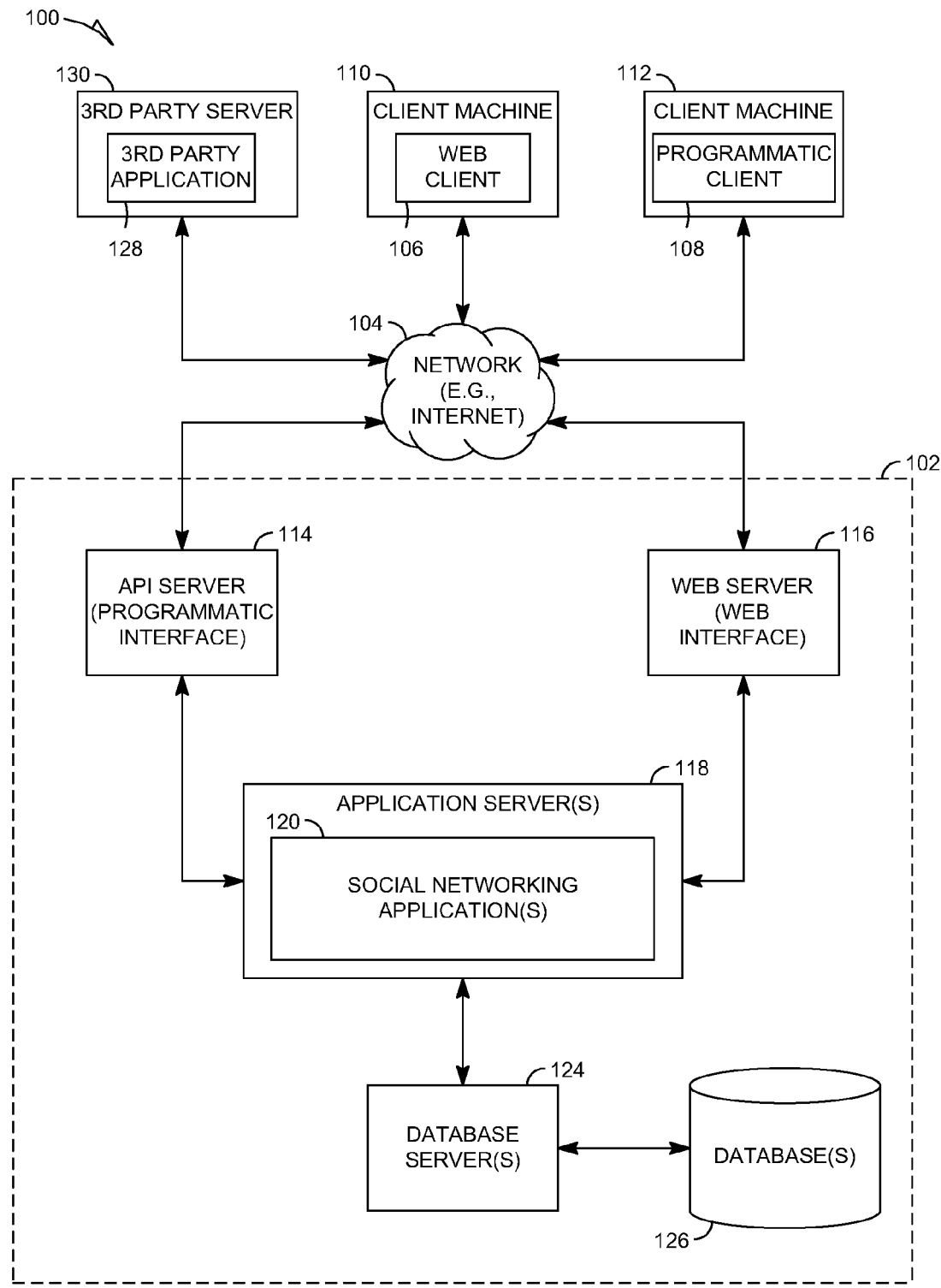
FIG. 1 is a network diagram depicting a client-server system within which various example embodiments may be deployed.

FIG. 1 is a network diagram depicting a client-server system 100, within which various example embodiments may be deployed. A networked system 102, in the example forms of a network-based social-networking or other communication system, provides server-side functionality, via a network 104 (e.g., the Internet or Wide Area Network (WAN)) to one or more clients. FIG. 1 illustrates, for example, a web client 106 (e.g., a browser, such as INTERNET EXPLORER® developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more social-networking applications 120. The application servers 118 are, in turn, shown to be coupled to one or more databases servers 124 that facilitate access to one or more databases or NoSQL or non-relational data stores 126.

The social-networking applications 120 may provide a number of social-networking functions and services to users that access the networked system 102. While the social-networking applications 120 are shown in FIG. 1 to form part of the networked system 102, in alternative embodiments, the social-networking applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various social-networking applications 120 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the applications 128, 106, and 108 may be coupled to multiple social networking applications 120, such as payment applications associated with multiple payment processors (e.g., VISA®, MASTERCARD®, and AMERICAN EXPRESS®).

The web client 106 accesses the various social-networking applications 120 via the web interface supported by the web server 116. Similarly, the programmatic client 108 accesses the various services and functions provided by the social-networking applications 120 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, social-networking, or payment functions that are supported by the relevant applications of the networked system 102.

Figure 2:
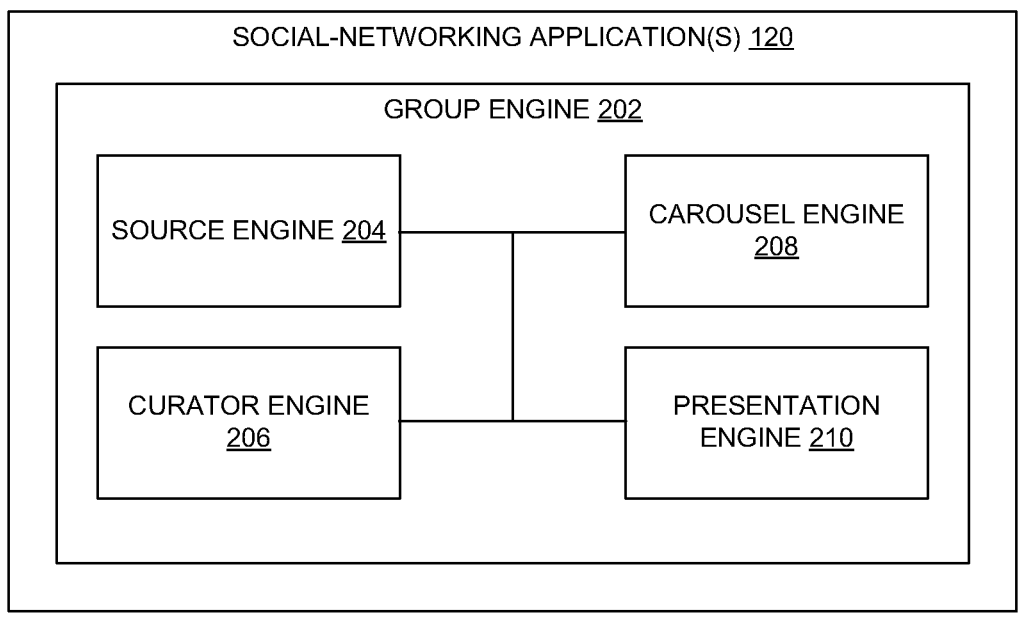
FIG. 2 depicts example engines of the social-networking applications 120.

FIG. 2 depicts example engines of the social-networking applications 120. The social-networking applications 120 include a group engine 202 configured to provide a service referred to as groups. The group service allows the users of the social-networking applications 120 to self-organize by creating, joining, and administering groups. Additionally, the group service may enable a user who is a member of a particular group to receive or follow (or express an opinion regarding the importance to the group of) source content items that are relevant to the group, such as postings of other members of the same group or posting from news feeds associated with the group.

The group engine 202 includes a source engine 204 configured to receive content items from content sources associated with the group. The content items may come in various forms, including blog postings, news feed postings, user postings (e.g., via a group sharing module, which is described in more detail below), and so on. The content sources may be associated with the group by an administrator of the group. The content items may be "new" items with respect to the group in that they may not have been previously presented (e.g., via a presentation engine 210) to members of the group.

The group engine 202 includes a curator engine 206 configured to enable one or more users of the social-networking applications 120 to serve as curators of content items that are received (e.g., via the source engine 204) as candidate content items to be presented to one or more members of the group.

The group engine 202 includes a carousel engine 208 configured to present the received content items in a user interface. The user interface may have a carousel style that enables a curator to step through, filter, navigate, or otherwise easily access the received content items such that the curator may specify his opinion of the importance of each content item to the group (see, e.g., FIG. 7). The carousel engine 208 may filter or present the received content items to each curator in a particular order based on information pertaining to the source of the content item (e.g., an importance level of the source to the group, which may be predetermined by an administrator of the group, or how recently the content item was received) or information pertaining to the curator (e.g., the curator's knowledge, interest, or expertise with respect to a subject matter of the content item). Thus, carousel engine 208 may ensure that the content items are presented to curators for judging based on various factors such as how new or relevant the content items are.

The group engine 202 includes the presentation engine 210 configured to present one or more of the received content items to members of the group. The presentation engine 210 may present a subset of the received content items based on the opinions of the curators of the importance to the group of each of the received content items. The presentation engine 210 may aggregate the opinions of the curators such that some opinions are weighted more heavily than others. For example, an opinion of a curator having a higher level of influence over members of the group or the social-networking site may be given more weight than an opinion of a curator having a lower level of influence. The curator engine 206 may determine a level of influence of a curator based on various factors, including the curator's number of connections, amount of time served as a member of the group or a user of the social networking applications 120, number of postings, title, appointed role, level of expertise, or any other data accessible by the social networking applications 120 pertaining to the curator's level of influence.

Figure 3:
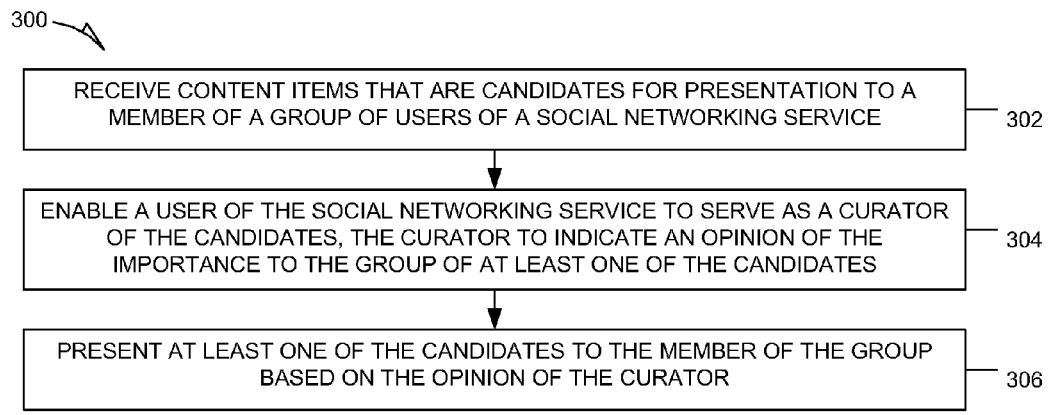
FIG. 3 depicts an example method of ranking or filtering new content items for presentation to members of a group.

FIG. 3 depicts an example method 300 of ranking or filtering new content items for presentation to members of a group. At operation 302, the source engine 204 receives content items that are candidates for presentation to a member of a group of users of a social-networking service (e.g., social-networking applications 120). The sources of the content items may include news services, blog services, users of the social-networking service, and so on. The sources may be associated with the group by an administrator of the group such that all content items generated by a source are automatically forwarded to the group as candidate content items to be presented to one or more members of the group. The candidates may include news feed postings, blog postings, or information (e.g., text, links, photos, or videos) shared by a user of the social-networking service or a member of the group (e.g., via the group sharing module described in more detail below).

At operation 304, the curator engine 206 presents the candidates to a curator of the group (e.g., via a carousel user interface presented by the carousel engine 208). The curator engine 206 may select the curator from users of the social-networking service or members of the group. The curator engine 206 receives from the curator an opinion of the importance of one or more of the candidates to the group.

At operation 306, the presentation engine 210 presents at least one of the candidates to a member of the group based on the opinion of the curator. The presentation engine 210 may further filter or rank the content items to be presented to the group member based on various factors, such as information about the interests of the user or the recentness of an original publication of the content item by the source of the content item. Thus, the presentation engine 210 may ensure that each member of the group is presented with a customized list of content items that is most relevant to the member.

Figure 4:
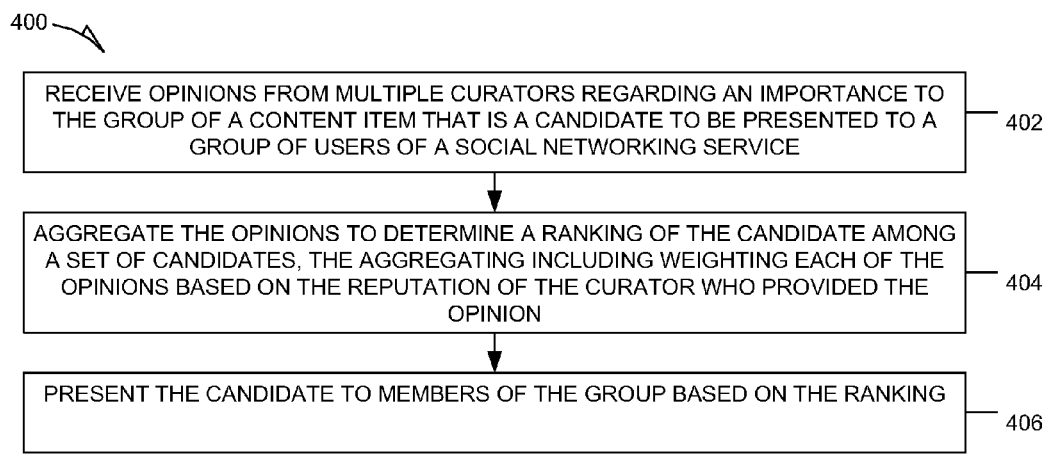
FIG. 4 depicts an example method of determining an importance of a content item to members of a group.

FIG. 4 depicts an example method 400 of determining an importance of a content item to members of a group. At operation 402, the curator engine 206 receives opinions from multiple curators regarding an importance to the group of the content item, which is a candidate to be presented to members of a group of users of a social-networking service (e.g., social-networking applications 120). In some embodiments, all users of the social-networking applications 120 or all group members may be curators. As described above with respect to FIG. 3, the content item may be received from one of various sources (e.g., a news service, a blog service, or a user of the social-networking service (e.g., via the group sharing module described below)) and have one of various types (e.g., a news feed posting, a blog posting, or information (e.g., text, links, photos, or videos) shared by the users). For example, a group member may submit an idea (or topic) to the group (e.g., via the group sharing module 600) for discussion or judgment by other group members. The curator engine 206 may receive the opinions via input entered by each curator via a carousel user interface (e.g., presented by the carousel engine 210), which is customized for each curator, to present a set of candidates and receive feedback from the curators on the candidates.

At operation 404, the curator engine 206 aggregates the opinions of the curators to determine a ranking of the candidate among a set of candidate content items. As described above, the aggregating may include a weighting of the opinions of the curators such that some opinions are favored over other opinions (e.g., an opinion of a curator having a good reputation among members of the group or the social-networking site may be favored over an opinion of a curator having a bad reputation). The curator engine 206 may determine that a discussion of the idea has become the most popular activity (or one of the most popular threads) of the group over a period of time (e.g., days or weeks) as a result of, for example, the other group members commenting on the idea or expressing their liking or disliking of the idea. For example, whenever a group member comments on the idea, all of that group member's followers may be notified of the group member's comment. In turn, the group member's followers may be more likely to participate in the discussion (e.g., decide to bring their expertise to bear on the matter). Upon a posting of one of the followers of the group member, followers of the follower of the group member may be notified of the follower's activity related to the idea, creating a snowball effect of participation in the discussion of the idea.

At operation 406, the presentation engine 210 presents the candidate to the members of the group based on the ranking. The presentation engine 210 may further filter or rank the candidates as described above with respect to operations of FIG. 3.

Figure 5:
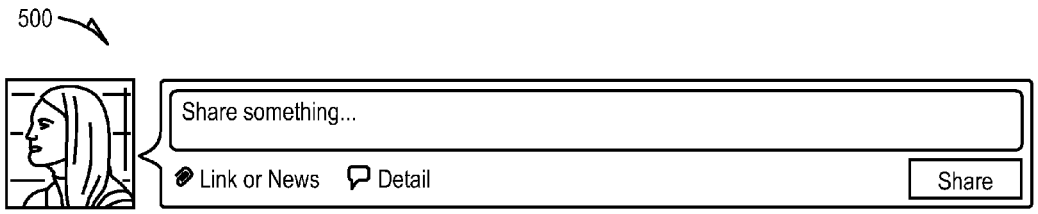
FIG. 5 depicts an example of a sharing module of a social-networking service.

FIG. 5 depicts an example of a sharing module 500 of a social-networking service. The sharing module 500 may be presented by source engine 204 to receive new content items from users of the social-networking applications 120. The sharing module 500 may have or include a user interface element that is displayed on the personal home page of the user, or within the landing page of a particular group, that enables the user to share text, a URL, a news item, a photo, a video, or other information with other users of the social-networking applications 120 or members of a group of such users.

FIG. 5 depicts the sharing module 500 as having a text box, in which the user can enter information he wishes to share with other users, a "Link or News" link, which the user can activate to enter a URL to an article, news feed, or other content source that he wishes to share, a "Detail" link in which the user can enter additional details about the information, and a "Share" button for publishing the information to the social-networking site and sharing it with other users. The URL being shared may be to a content source that is external to the social-networking site. In FIG. 5, the sharing module is also associated with an image of the user. Additionally, the information is enclosed in a balloon associated with the image to represent that the user is communicating the information to other users.

In addition to user services, the social-networking applications 120 may also include a group engine 202 that is configured to, for example, enable users to self-organize into groups. The groups may be associated with particular topics that the users may be interested in discussing, organizations that the users may want to join or express an affiliation with, or companies that the users work for. For example, the social-networking site may include groups for fans of the Smash Mouth band, for software engineers interested in discussing Android operating system development, for workers of MICROSOFT®, and so on. A user may create or join a group.

After joining a group, a user may choose to specify his membership in the group on his personal home page. A creator of a group may serve as an administrator of a group or designate another user to serve as the administrator of the group. An administrator may, in turn, designate other users to serve as additional administrators of the group. An administrator of the group may have special privileges that non-administrators do not have. For example, an administrator may be responsible for allowing a user to join the group, deleting posts, moving posts, and so on. Additionally, an administrator may also have further privileges related to controlling the sources of content that may be displayed on the group home page, as described below.

A user that is a member of a group may wish to share information with other members of the group. To simplify this sharing of information, the group engine 202 may provide a group sharing module (e.g., to be displayed on a group home page for each group).

Figure 6:
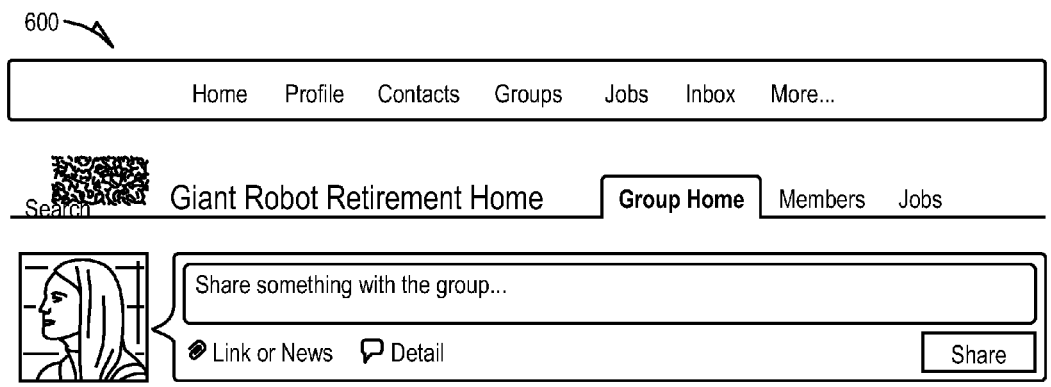
FIG. 6 depicts an example group sharing module of a social-networking service.

FIG. 6 depicts an example group sharing module 600 of a social-networking service. Although the group sharing module 600 depicted in FIG. 6 is similar to the sharing module 500 depicted in FIG. 5, the group sharing module 600 may be the same as or different from the sharing module 500 that the user uses to share information on his personal home page. The group sharing module 600 may be accessible via a tab (e.g., a "Group Home" tab) of the group home page.

Although the process the user uses to share information with the group may be the same (or, at least, similar to) the process the user uses to share information with his connections or followers (e.g., via the sharing module 500), the goals of group sharing may be different from the goals of individual sharing. For example, an idea that the user finds interesting may not be interesting to a majority of the members of the group and vice versa. Furthermore, there may be a different level of demand for information related to the group by members of the group than for information related to the user by the connections or followers of the user.

In addition to an input mechanism like a group sharing module 600 that allows a member of the group to share information with other members of the group, the group engine 202 may also provide another input mechanism that allows a user having administrative privileges to the group (e.g., a group creator, administrator, or moderator) to designate one or more additional types or sources of content (e.g., a blog, blog posting service, bulletin board service, newsfeed, etc.) to provide content on the group home page. For example, for a group of fans of a media property (e.g., the Smash Mouth band), the group engine 202 may enable a moderator to designate a blog for one of the band members or a newsfeed from the band's web site to automatically post content onto the group home page. As another example, for a group focused on the Android mobile operating system development, the group engine 202 may enable a moderator to select a subset of external content sources to provide content onto the group home page. The group engine 202 may respond to a command from a moderator to enable the external content sources to post onto the group home page automatically. By enabling postings onto the group home page from external sources, the group engine 202 may encourage participation in the group (e.g., start a discussion among group members) or provide members of the group with information they would find useful.

Figure 7:
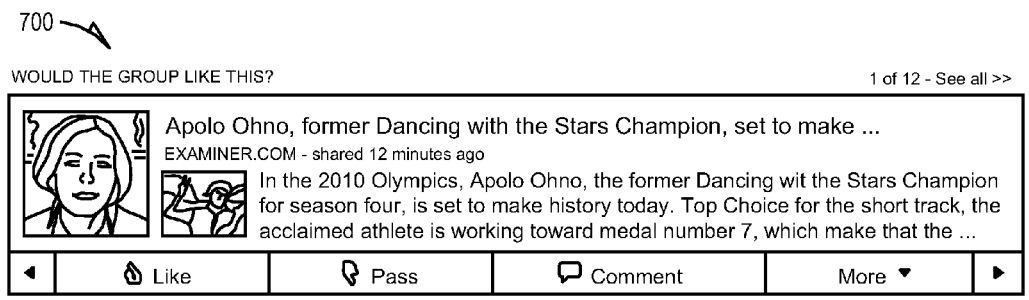
FIG. 7 depicts an example carousel user interface that enables users of the social-networking applications to become curators of content associated with a group.

FIG. 7 depicts an example carousel user interface 700 that enables users of the social-networking applications 120 to become curators of content associated with a group and received from various sources (including members of the group or external content sources). The carousel user interface 700 may be presented by the carousel engine 208. For example, the carousel engine 208 may present the carousel user interface 700 as a graphical user interface element within a group home page in order to draw the attention of a curator to recently received or posted items. The carousel user interface 700 may provide mechanisms for the curator to indicate an importance or a relevance of each of the new items to the group. The carousel engine 208 may present the carousel user interface 700 in an area of the group home page that is specifically designated for the carousel user interface 700.

The carousel user interface 700 may include content items provided to the group (e.g., via the source engine 204). Such content items may be received from a group member via the group sharing module or from an external source. Although the example carousel user interface 700 depicted in FIG. 7 contains a single content item (e.g., a news feed posting), the carousel user interface 700 may include multiple content items. For example, the carousel user interface 700 may include a subset (e.g., one) of a particular number (e.g., twenty) of the content items that were most recently received. The carousel engine 208 may ensure that subsets of items in the carousel user interface 700 are sorted chronologically (e.g., by input date) or by a user-specific priority (e.g., the strength of a relationship between the group member viewing the carousel and each of the group members that provided an item to the carousel). For example, in some embodiments, a certain number of the most recent postings to the group may be selected and then ordered such that the most recent posting that was posted by someone who the viewing user follows is presented first in the carousel user interface 700.

Regardless of how subsets of items are sorted, the carousel engine 208 may ensure that the carousel user interface 700 initially displays a particular item for a first group member based on a calculation of which of the items contained in the carousel user interface 700 has the highest probability of capturing the interest of the first group member. The carousel engine 208 may ensure that a number of items in the displayed subset are configurable for all group members by an administrator or configurable by each group member on a group-member basis (e.g., the group member may be able to display all of the items in the carousel by clicking on a "See all" link.) The number of items in the displayed subset may default to one. The maximum number of items in the carousel may be configurable or based on system capabilities or resources.

The carousel engine 208 may prioritize or sort items included in the carousel user interface 700 based on metadata associated with the curator (e.g., a member of the group who is viewing the carousel). For example, the curator may have a stronger relationship with a first group member than the curator has with a second group member (e.g., the curator may be connected to the first group member, whereas the curator may merely be a follower of the second group member, or the curator may be a follower of the first group member but may not have a specified relationship with the second group member). In this case, for the curator, the carousel may initially display an item posted to the group by the first group member instead of displaying an item posted to the group by the second group member. A designation of a connection between the curator and the first group member may cause the carousel engine 208 to treat the curator as a follower of the first group member and treat the first group member as a follower of the curator. However, the designation of the curator as a follower of the first group member may not cause the carousel engine 208 to treat the viewing curator as a connection of the first group member or treat the first group member as a follower of the curator.

Thus, the carousel engine 208 may use strengths of relationships between the curator and other group members (e.g., whether the curator is connected to or follows a first group member or whether another designated relationship exists between the curator and the first group member) to determine which subset of items to first display to the curator in the carousel user interface 700 and how to order the subsets of items for the curator. The carousel engine 208 may also prioritize or sort items based on whether they are directly submitted by a real person (e.g., a chief executive officer (CEO) of a company) or received automatically by an external source, such as a data feed.

After a group member posts a content item to the group (e.g., the group member uses the group sharing module to share a link), the carousel engine 208 may add the content item into the carousel user interface 700 as a new content item. The new content item may then be seen by group members when they view the group home page. The carousel engine 208 may cause the carousel user interface 700 to display a first subset (e.g., one) of the content items in the carousel user interface 700 for a specific amount of time (e.g., five seconds), then display a second subset of items for a specific amount of time, and so on, rotating through a display of all of the subsets of items to be presented in the carousel user interface 700. Upon completing the display of a last subset of content items, the carousel engine 208 may cause the carousel user interface to loop back and display the first subset of items. In addition to enabling a user to automatically scroll through subsets of items and view them, the carousel user interface 700 may include a user interface element to enable a curator to navigate to a particular subset of items within the carousel user interface 700. For example, the carousel user interface 700 may include arrow buttons on the left and right of the carousel to allow the curator to navigate forward or backward through the subsets of items to be presented in the carousel user interface 700. Navigating forward from the first subset of items may cause the carousel user interface 700 to display the last subset of items, and navigating backward from the last subset of items may cause the carousel user interface 700 to display the first subset of items.

The carousel engine 208 may have a filtering mechanism to prevent "noise makers," "self-promoters," and input from external sources (e.g., really simple syndication (RSS) feeds, web feeds, blogs, etc.) from filling up the carousel user interface 700. A "noise maker" may be a group member whose participation in the group has generally not been valuable to other group members. A "self-promoter" may be a group member who participates in the group primarily to bring attention to himself. A determination by the carousel engine 208 of whether a group member is a noise maker or self-promoter may be based on feedback from group members or a designation by an administrator or moderator of the group. For example, if the source engine 204 receives multiple items from a single RSS feed, the carousel engine 208 may display a subset (e.g., one) of the items in the carousel user interface 700. The subset of the items from the RSS feed may be selected by the carousel engine 208 based on various factors (e.g., how recently the item was submitted or published). In this way, the carousel engine 208 may enable posts by a group member to have more visibility to other group members than posts by a non-group member (e.g., an external source) or a group member that may not be providing valuable content (e.g., a noise-maker or self-promoter). Thus, the filtering mechanism may allow group members to focus on activities of people they are following instead of activities of or provided by an external source. For example, a group associated with a company may be configured to automatically receive submissions on a regular basis from various external sources that provide content relevant to the business of the company. More rarely, the group may receive a submission from the company's CEO. As described above, the carousel engine 208 may filter the items coming from each of the various sources such that only the most recent item from each of the external sources is included in the carousel user interface 700. Thus, it may be more likely that a curator viewing the carousel user interface 700 will see the submission from a real person (e.g., the CEO of the company) without being overwhelmed by submissions from external sources.

The carousel user interface 700 may have or be associated with user interface elements (e.g., buttons, links, and so on) that enable a curator to specify a liking of an item, specify a lack of interest in the item, specify a desire to comment on the item, share the item with another user of the social-networking system, report the item as a job posting, report the item as inappropriate, or reply privately to a submitter of the item. Additionally, the carousel user interface 700 may include user interface elements that enable an administrator or moderator of the group to delete the item or move the item from the carousel to a separate area of the group (e.g., move a jobs posting from the carousel to a jobs posting area of the group). The carousel may also include a title, such as "WOULD THE GROUP LIKE THIS?"

When a curator engages a user interface element associated with the carousel user interface 700, thereby performing an action associated with a content item, the carousel engine 208 may cause the carousel user interface 700 to interact dynamically with the user in various ways, including ways that encourage further participation of users (e.g., group members) in the group (e.g., encouraging postings of comments related to the item or expressions of liking of an item). For example, when a curator specifies a liking of an item in the carousel user interface 700 (e.g., when the curator clicks on a "Like" link associated with the item in the carousel user interface 700), the carousel engine 208 may cause the carousel user interface 700 to indicate a level of interest expressed by other users in the item.

FIG. 8A depicts an example carousel user interface 800 in which a message has been overlaid briefly (e.g., for a second) over a liked content item to indicate a percentage of other users that also liked the content item.

FIG. 8B depicts an example carousel user interface 850 in which a spinner (e.g., a moving circular graphic) has been briefly overlaid over a displayed content item to indicate that a message is being loaded into the carousel user interface 850. The spinner (or the message) may have configurable attributes (e.g., a roll up time, a display time, and a fade away time). Each of the configurable attributes may have a default value (e.g., a roll up time of 100 milliseconds (ms), a display time of 400 ms, and a fade away time of 100 ms).

FIG. 8B also depicts an example carousel user interface 860 in which a message is overlaid briefly over a displayed content item to specify that a curator is the first curator to express a liking of the displayed content item. The message may have configurable attributes, including a font size relative to a default font size. For example, the message may be configured to be displayed with a font-size of 250% (or 32.5 points) relative to a default font size of 13 points.

FIG. 8B also depicts user interface elements that not only enable a curator to follow developments (e.g., user activity) with respect to a candidate content item, but also enable a curator to follow a source of a content item (e.g., a person, an RSS feed, or other source). For example, if the source of a candidate content item is a person named "Alexis," one of the options available to a curator via the carousel user interface 860 may be an option to "Follow Alexis." As another example, an option available to the curator via the carousel user interface 860 may be an option to follow a discussion related to the currently displayed candidate content item. As another example, an option available to a curator may be an option to designate a candidate content item as a "Manager's Choice" content item (see FIG. 17 below). Various options (e.g., the "Make Manager's Choice" option) may be available only to curators having special privileges (e.g., curators that have been appointed as administrators of the group).

FIG. 9 depicts an example carousel user interface 900 in which a message has been overlaid briefly over a passed content item (e.g., when the curator clicks on a "Pass" link associated with the item carousel) to indicate not only a success of the passing action, but also a level of interest of other users (e.g., group members or other curators) in the passed content item. The level of interest may be displayed in a non-obtrusive manner (e.g., in a font size that is smaller than the message specifying that the group member has passed on the item). The indication of the level of interest of other users in the passed content item may be presented as a subtle attempt for a curator to change his mind about passing on the content item.

When a user of the social-networking service (e.g., a curator or group member) specifies a desire to comment on a content item (e.g., when the user clicks on a "Comment" link associated with the item), the user may be directed to an external site that provides more complete information pertaining to the content item (e.g., when the item is related to or comes from an external source) or to a "details" page associated with the content item (e.g., when the content item was provided to the group by a group member via the group sharing module on the group home page). When directing the user to an external source, the carousel engine 208 may cause the starting of a new instance or open a new tab in a current instance of the user's web browser to display a page at a web site associated the item at the external source. When directing the user to the details page associated with the item, the carousel engine 208 may not cause the starting of a new instance or open the new tab in the current instance of the user's web browser, instead navigating to the details page from the current instance or tab of the user's web browser.

The details page associated with the content item may display the content item itself, information about a user who submitted the content item (e.g., the user's name, title, company, and so on), and comments posted by other users (e.g., group members) with respect to the content item. The details page may also enable the user who specified a desire to comment on the item to submit a comment or indicate an interest in following email comments made by other users with respect to the content item.

Figure 10:
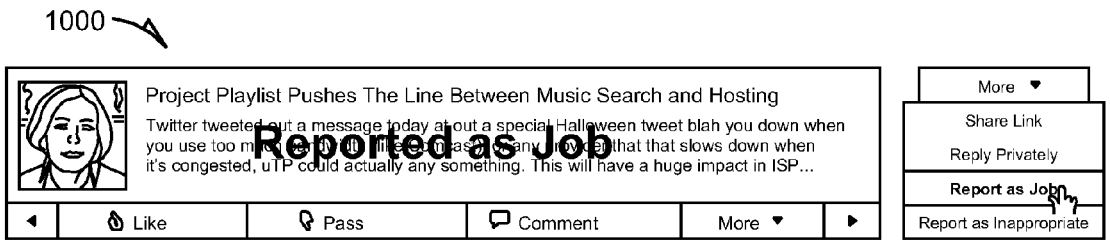
FIG. 10 depicts an example result of an action by a user to specify that a content item presented in the carousel user interface is a job posting.

The carousel engine 208 may support a tagging of items by group members as inappropriate for presentation in the carousel user interface 1000. For example, FIG. 10 depicts an example result of an action by a user to specify that a content item presented in the carousel user interface 1000 is a job posting. In response to the user's action, the carousel engine 208 may move the content item to a job discussion area associated with the group home page based on a determination that the content item is more appropriate for the job discussion area.

Figure 11:
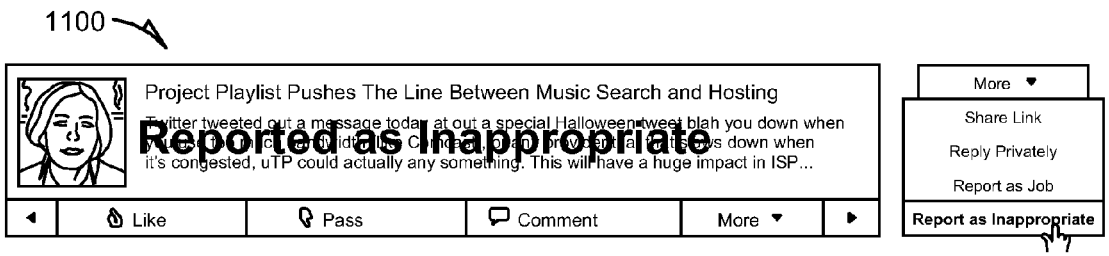
FIG. 11 depicts an example result of an action by a user to report that a content item is generally inappropriate for the carousel user interface.

As another example, FIG. 11 depicts an example result of an action by a user to report that a content item is generally inappropriate for the carousel user interface 1100. In response to the user's action, the carousel engine 208 may classify the content item as spam or prevent the content item from being presented in the carousel user interface 1100 to other users.

When a user tags an item as inappropriate (e.g., when the user clicks on a "Report as Job" or "Report as Inappropriate" link, respectively), the carousel engine 208 may cause an indication of the success or failure of the reporting (e.g., the carousel engine 208 may cause a message to be briefly overlaid over the reported-on item, indicating whether the reporting action was successful with respect to the item). Furthermore, when a number of reports of an item being a job or inappropriate transgresses a threshold (e.g., 3 reports), the carousel engine 208 may automatically delete or move the item. The carousel engine 208 may restrict actions that may be performed with respect to content items presented in the carousel user interface (e.g., carousel user interface 1100) based on whether a user performing the action is a group member or administrator of the group. For example, the carousel engine 208 may prevent users from reporting a content item as a job unless the users are group members.

Figure 12:
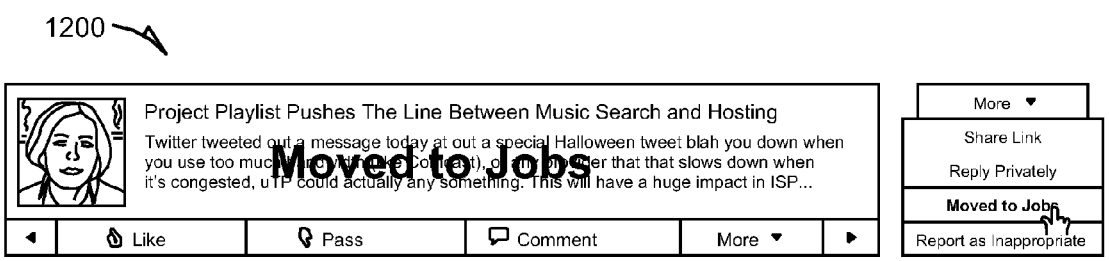
FIG. 12 depicts an example result of an action by a user to move a content item from the carousel user interface to a jobs area associated with the group.

FIG. 12 depicts an example result of an action by a user (e.g., a group administrator) to move a content item from the carousel user interface 1200 to a jobs area associated with the group.

Figure 13:
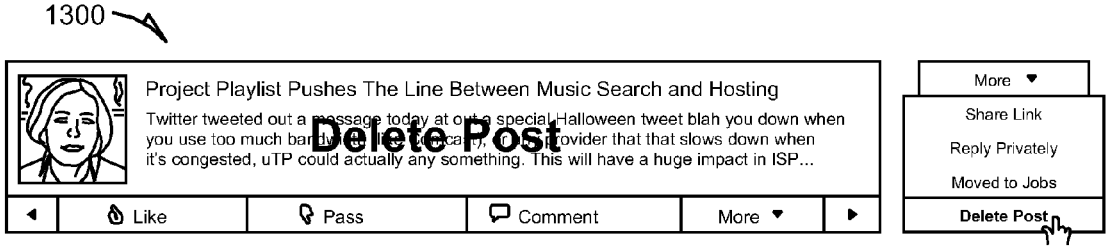
FIG. 13 depicts an example result of an action by a user to delete a content item from the carousel user interface.

FIG. 13 depicts an example result of an action by a user to delete a content item from the carousel user interface 1300. Such deleting or moving activities may be restricted to group administrators or available to all group members. Here, when the user indicates a desire to delete or move a content item (e.g., when the group administrator clicks on a "Delete Post" or "Move to Jobs" link) the carousel engine 208 may cause a message to be briefly overlaid over the deleted or moved content item indicating whether the deleting or moving operation, respectively, was successful with respect to the content item. In response to a deleting or moving of content items appearing in the carousel user interfaces 1200 or 1300, the carousel engine 208 may ensure that the content items are not presented in the carousel user interface to other users.

FIG. 14 depicts various presentation formats 1400 in which content items may be presented to users (e.g., group members) when they access a group home page or to curators when they access the carousel user interface 700. The presentation engine 210 may present selected content items (e.g., based on opinions of the curators of the importance of the content items with respect to the group or information pertaining to the user who is viewing the content items) using any combination of such presentation formats. The carousel engine 208 may use any combination of the presentation formats 1400 to present content items received from content sources associated with the group to curators.

For example, the presentation of each content item may include a presentation of a one-line headline of the item, a one-line URL associated with the item, an image associated with the item, or a three-line excerpt of text associated with the item. Alternatively, various elements may not be displayed at all or additional elements or portions of elements associated with the item may be displayed (e.g., comments associated with the item or metadata, such as metadata including information on the number of comments associated with the item, when the item was submitted, when the item was published, and so on). The particular elements, the number of lines used to present each element, and other elements, may be configurable by, for example, a group administrator on a group basis or a group member on a group-member basis.

FIG. 15 depicts an example of a "most popular" user interface element 1500. The presentation engine 210 may represent the popularity of various activities within a group in the "most popular" user interface element 1500. A particular area of the group home page may be designated for the presentation engine 210 to display the "most popular" user interface element. In the "most popular" user interface element 1500, the presentation engine 210 may present a subset (e.g., 10) of the discussions within the group that have received the most attention from group members (e.g., discussions that have received the most comments, expressions of liking or disliking, or reading by group members). When a user navigates manually between subsets of items displayed by the carousel (e.g., when the user clicks on an arrow button to manually scroll forward or backward through the subsets, thus ignoring a subset of items) or when the group member explicitly specifies a passing on the item (e.g., when the group member clicks on a "Pass" link associated with the item), the carousel engine 208 may associate the user's action with a negative popularity of the item.

The presentation engine 210 may sort the activities within the "most popular" user interface element based on various popularity factors, including the number of comments received, the number of expressions of likes, ignores, and passes, or the number of clicks or reads. Thus, after a user makes a submission to the group, the submission may flow into the carousel user interface 700, which may bring the submission to the attention of other users. The other users may, in turn, perform an action related to the submission that drives up (or down) the popularity of the submission directly (e.g., by commenting on the submission) or indirectly (e.g., by bringing the submission to the attention of a follower, who then comments on the submission). Eventually, the submission may become one of the most popular submissions of the group, and appear in the "most popular" user interface element 1500, which may, in turn, further drive group participation in activities (e.g. additional comments or submissions) related to the submission.

Like the carousel user interface 700, the "most popular" user interface element 1500 may include a title (e.g., "MOST ACTIVE DISCUSSIONS") and each item presented in the "most popular" user interface element 1500 may include configurable presentation elements. For example, each item may be associated with one or more images associated with one or more users who provided comments on the content item, and a clicking of one of the images may display a comment provided by the user associated with the image. An excerpt of one or more comments associated with the content item along with metadata about the comment (e.g., elapsed time since a submission or publication of the item) may be included in a display of the content item in the "most popular" user interface element. The carousel and the "most popular" user interface element may use the same content item presentation elements or different content item presentation elements (e.g., the carousel user interface 700 may not display the number of comments associated with an item, whereas the "most popular" user interface element 1500 may display the number of comments associated with the item). A user may be able to perform the same actions with respect to the "most popular" user interface element 1500 as the group member can perform with respect to the carousel user interface element 700 and vice versa.

Figure 16:
FIG. 16 depicts an example of a "top influencers" user interface element.

FIG. 16 depicts an example of a "top influencers" user interface element 1600. The presentation engine 210 may cause users (e.g., group members) who contribute the most popular items (as determined by the various popularity criteria) to appear in a "top influencers" user interface element of the group home page. In fact, a particular area of the group home page may be designated for a listing of the top influencers. The listing of the top influencers may include an image associated with a subset (e.g., 3) of the group members whose activities most increased the overall popularity of the group (as measured by the various popularity metrics).

The group engine 202 may include an engine (e.g., a de-duplication engine) to minimize the redundancy between content items displayed in the carousel user interface 700 and the "most popular" user interface element 1500. The de-duplication engine may ensure that a content item contained in the carousel user interface 700 does not appear on the first page of the "most popular" user interface element 1500. However, the de-duplication engine may allow the content item contained in the carousel user interface 700 to appear on pages other than the first page of the "most popular" user interface element 1500.

Figure 17:
FIG. 17 depicts an example of a "Manager's Choice" user interface element.

FIG. 17 depicts an example of a "Manager's Choice" user interface element 1700. The presentation engine 210 may present a "Manager's Choice" user interface element 1700 to enable a manager of the group to post or bring attention to content items that the manager believes are of particular interest to the group. The content items selected by the manager for presentation in the "Manager's Choice" user interface element 1700 may be independent of the content items selected by the curators for presentation to group members on the group home page. The source engine 204 may provide a mechanism (e.g., a user interface) for receiving the content items that the manager has selected for presentation in the "Manager's Choice" user interface element 1700. The source engine 204 may select the manager from users of the social-networking application 120 that are administrators of the group.

Figure 18:
FIG. 18 depicts an example of a "People I'm Following" user interface element.

FIG. 18 depicts an example of a "People I'm Following" user interface element 1800. The presentation engine 210 may present the "People I'm Following" user interface element 1800 on the group home page. The user interface element 1800 may enable a user to view group members that the user is following. Another user interface element (e.g., a "People You're Following" user interface element) may include or enable the user to view information about the group members who are following the user.

A social-networking site may also include group home page hubs, which combine various elements of multiple group home pages into a single home page. For example, the various user interface elements (e.g., the carousel, the "most popular," and the top influencer user interface elements) of multiple group home pages may be combined into respective user interface elements of a group home page hub. For example, items in a carousel of a first group home page may be combined with items in a carousel of a second group home page into a single carousel of a group home page hub. Thus, a member of a group home page hub may monitor multiple group home pages in a central location, including monitoring the most recent items, the most popular items, the top influencers, and so on, of the multiple associated group home pages.

Engines, Modules, Components and Logic

Certain embodiments are described herein as including logic or a number of components, modules, engines, or mechanisms. Modules or engines may constitute either software modules or engines (e.g., code embodied on a machine-readable medium or in a transmission signal) or hardware modules or engines. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or other programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

Accordingly, the term "hardware engine" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware engines are temporarily configured (e.g., programmed), each of the hardware engines need not be configured or instantiated at any one instance in time. For example, where the hardware engines comprise a general-purpose processor configured using software, the general-purpose processor may be configured as respective different hardware engines at different times. Software may accordingly configure a processor, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple of such hardware engines exist contemporaneously, communications may be achieved through signal transmissions (e.g., over appropriate circuits and buses) that connect the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

Similarly, the methods described herein may be at least partially processor-implemented. For example, at least some of the operations of a method may be performed by one or processors or processor-implemented engines. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs.)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a engine, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
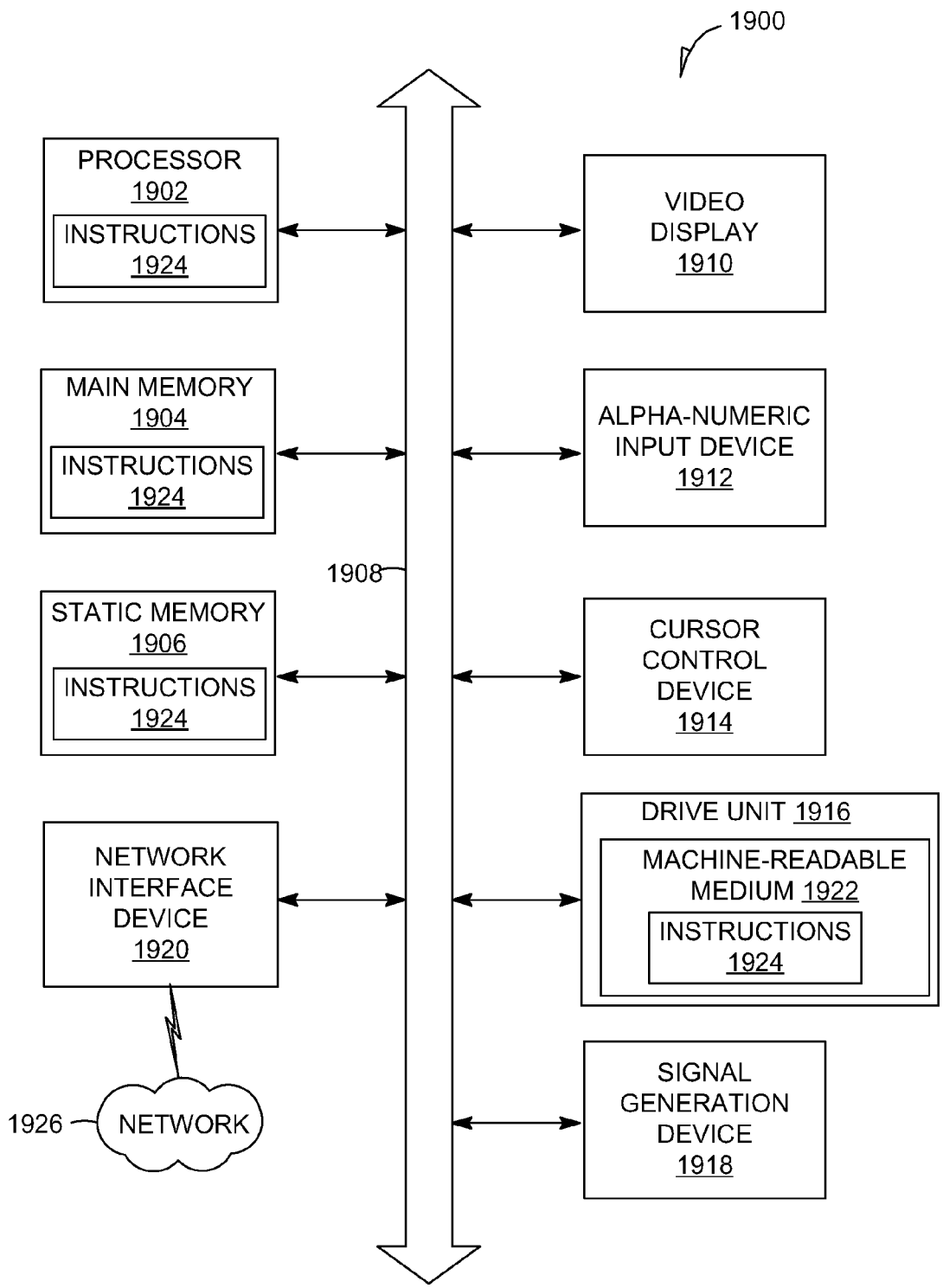
FIG. 19 is a block diagram of a machine in the example form of a computer system within which instructions for causing the machine to perform any one or more of the methodologies discussed herein may be executed.

FIG. 19 is a block diagram of machine in the example form of a computer system 1900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a user interface (UI) navigation (or cursor control) device 1914 (e.g., a mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of instructions and data structures (e.g., software) 1924 embodying or utilized by any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also constituting machine-readable media. The instructions 1924 may also reside, completely or at least partially, within the static memory 1906.

While the machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1924 may further be transmitted or received over a communications network 1926 using a transmission medium. The instructions 1924 may be transmitted using the network interface device 1920 and any one of a number of well-known transfer protocols (e.g., Hyper Text Transfer Protocol or HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving content items from one or more content sources associated with a group of users of a social-networking service, the content items being candidates for presentation to members of the group, each of the one or more content sources being external from the group;

enabling an additional member of the group to serve as a curator of the candidates, the enabling including presenting the candidates in a carousel user interface, the carousel user interface including user interface elements for enabling the additional member to scroll through subsets of the candidates and user interface elements for enabling the additional member to indicate an opinion of the additional member with respect to an importance to the group of each of one or more of the candidates;

selecting one or more of the candidates for presentation to the members of the group based on the opinion of the additional member of the group with respect to the importance to the group of each of the one or more candidates; and enabling a further member of the group to serve as an additional curator of the candidates;

determining a collective opinion of the curator and the additional curator with respect to an importance to the group of each of the one or more candidates;

wherein the determining of the collective opinion is weighted in favor of the curator based on the curator having a better reputation among the members of the group than the additional curator.

2. The method of claim 1, further comprising prioritizing the candidates for presentation to the additional member in the carousel user interface based in part on a level of activity of connections of the additional member with respect to the candidates.

3. The method of claim 1, further comprising prioritizing the candidates for presentation to the member based on an opinion of the additional member with respect to an importance to the group of each of the one or more content sources associated with the candidates.

4. The method of claim 1, wherein the enabling of the additional member to serve as the curator of the candidates is based on a level of influence of the additional member.

5. The method of claim 1,
wherein the user interface elements for enabling the additional member to indicate an opinion of the additional member with respect to an importance to the group of each of one or more of the candidates includes a user interface element for passing the content item.

6. The method of claim 1,
wherein the user interface elements for enabling the additional member to indicate an opinion of the additional member with respect to an importance to the group of each of one or more of the candidates includes a user interface element for flagging the content item as inappropriate.

7. A system comprising:
a processor;
a source engine configured to receive content items from one or more content sources associated with a group of users of a social-networking service, the content items being candidates for presentation to members of the group, each of the one or more content sources being external from the group;
a curator engine implemented by the processor and configured to enable an additional member of the group to serve as a curator of the candidates, the enabling including using a carousel engine configured to presenting the candidates in a carousel user interface, the carousel user interface including user interface elements for enabling the additional member to scroll through subsets of the candidates and
user interface elements for enabling the additional member to indicate an opinion of the additional member with respect to an importance to the group of each of one or more of the candidates;
a presentation engine configured to select one or more of the candidates for presentation to the members of the group based on the opinion of the additional member with respect to the importance to the group of each of the one or more candidates; and
the curator engine further configured to enable a further member of the group to serve as an additional curator of the candidates; and
determine a collective opinion of the curator and the additional curator with respect to an importance to the group of each of the one or more candidates;
wherein the determining of the collective opinion is weighted in favor of the curator based on the curator having a better reputation among the members of the group than the additional curator.

8. The method of claim 7, wherein the carousel engine is further configured to prioritize the candidates for presentation to the additional member in the carousel user interface based in part on a level of activity of connections of the additional member with respect to the candidates.

9. The method of claim 7, wherein the carousel engine is further configured to prioritize the candidates for presentation to the additional member in the carousel user interface based on an opinion of the additional member with respect to an importance to the group of each source of the candidates.

10. The method of claim 7, wherein the enabling of the additional member to serve as the curator of the candidates is based on a level of influence of the additional member.

11. A non-transitory machine readable medium embodying a set of instructions that, when executed by a processor, cause the processor to perform operations comprising:
receiving content items from one or more content sources associated with a group of users of a social-networking service, the content items being candidates for presentation to members of the group of users of the social-networking service, each of the one or more content sources being external from the group;
enabling an additional member of the group to serve as a curator of the candidates, the enabling including presenting the candidates in a carousel user interface, the carousel user interface including user interface elements for enabling the additional member to scroll through subsets of the candidates and
user interface elements for enabling the additional member to indicate an opinion of the additional member with respect to an importance to the group of each of one or more of the candidates;
selecting one or more of the candidates for presentation to the members of the group based on the opinion of the additional member of the group with respect to the importance to the group of each of the one or more candidates; and
enabling a further member of the group to serve as an additional curator of the candidates;
determining a collective opinion of the curator and the additional curator with respect to an importance to the group of each of the one or more candidates;
wherein the determining of the collective opinion is weighted in favor of the curator based on the curator having a better reputation among the members of the group than the additional curator.

12. The non-transitory machine readable medium of claim 11, the operation further comprising prioritizing the candidates for presentation to the additional member in the carousel user interface based in part on a level of activity of connections of the additional member with respect to the candidates.

13. The non-transitory machine readable medium of claim 11, the operation further comprising prioritizing the candidates for presentation to the member based on an opinion of the additional member with respect to an importance to the group of each of the one or more content sources associated with the candidates.

14. The non-transitory machine readable medium of claim 11, wherein the enabling of the additional member to serve as the curator of the candidates is based on a level of influence of the additional member.

* * * * *

UNITED STATES PATENT AND TRADEMARK OFFICE
CERTIFICATE OF CORRECTION

PATENT NO. : 8,732,590 B2  
APPLICATION NO. : 13/086662  
DATED : May 20, 2014  
INVENTOR(S) : Barker et al.

Page 1 of 1

It is certified that error appears in the above-identified patent and that said Letters Patent is hereby corrected as shown below:

In the Claims

Column 18, line 53, in Claim 1, after "candidates", insert --;--, therefor

Column 19, line 42, in Claim 7, delete "presenting" and insert --present--, therefor Column 19, line 46, in Claim 7, after "candidates", insert --;--, therefor Column 20, line 29, in Claim 11, after "candidates", insert --;--, therefor Signed and Sealed this  
Twenty-fifth Day of November, 2014

Michelle K. Lee  
*Deputy Director of the United States Patent and Trademark Office*